(12) United States Patent
Kim

(10) Patent No.: US 11,126,379 B2
(45) Date of Patent: Sep. 21, 2021

(54) MEMORY SYSTEM

(71) Applicant: SK hynix Inc., Gyeonggi-do (KR)

(72) Inventor: Do Hun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/887,520

(22) Filed: May 29, 2020

(65) Prior Publication Data

US 2021/0157527 A1    May 27, 2021

(30) Foreign Application Priority Data

Nov. 25, 2019  (KR) .................. 10-2019-0152195

(51) Int. Cl.
*G06F 3/06* (2006.01)

(52) U.S. Cl.
CPC .......... *G06F 3/0659* (2013.01); *G06F 3/0613* (2013.01); *G06F 3/0673* (2013.01)

(58) Field of Classification Search
CPC ..... G06F 3/0659; G06F 3/0613; G06F 3/0673
USPC ........................................................ 711/155
See application file for complete search history.

(56) References Cited

U.S. PATENT DOCUMENTS

| | | | | |
|---|---|---|---|---|
| 6,490,642 B1 * | 12/2002 | Thekkath | ............. | G06F 13/364 710/108 |
| 8,112,595 B1 * | 2/2012 | Bar-El | ................ | G06F 13/4243 711/155 |
| 8,464,008 B1 * | 6/2013 | Bar-El | ................ | G06F 13/4243 711/155 |
| 9,983,830 B2 * | 5/2018 | Ware | ..................... | G11C 7/1009 |
| 10,612,684 B2 * | 4/2020 | Grajeda | ................ | B60T 8/3675 |
| 2003/0120880 A1 * | 6/2003 | Banno | .................. | G11C 7/1006 711/155 |
| 2009/0300297 A1 * | 12/2009 | Ikeuchi | ............... | G06F 11/1008 711/155 |
| 2016/0230962 A1 * | 8/2016 | Yan | ........................ | G06F 3/0665 |
| 2017/0075823 A1 * | 3/2017 | Ward | .................... | G06F 3/0619 |
| 2020/0142636 A1 * | 5/2020 | Liao | ........................ | G06F 3/061 |

FOREIGN PATENT DOCUMENTS

| | | |
|---|---|---|
| KR | 10-2017-0070920 A | 6/2017 |
| KR | 10-179016581 | 11/2017 |
| KR | 10-1858159 | 6/2018 |
| KR | 10-2019-0054974 A | 5/2019 |
| KR | 10-2019-0067088 A | 6/2019 |
| KR | 1020200095103 A | 8/2020 |

* cited by examiner

*Primary Examiner* — Christopher B Shin
(74) *Attorney, Agent, or Firm* — IP & T Group LLP

(57) ABSTRACT

A memory system includes a memory device including a plurality of segments; a processor configured to generate a Read-Modify-Write (RMW) command on a target segment address corresponding to a target segment among the plurality of segments; a scheduler configured to receive the RMW command from the processor and schedule the RMW command; and a RMW unit configured to execute the RMW command on the memory device according to control of the scheduler, wherein the scheduler compares, when a plurality of RMW commands received from the processor are pending, target segment addresses of the plurality of RMW commands to re-order the plurality of RMW commands.

21 Claims, 11 Drawing Sheets

FIG.4
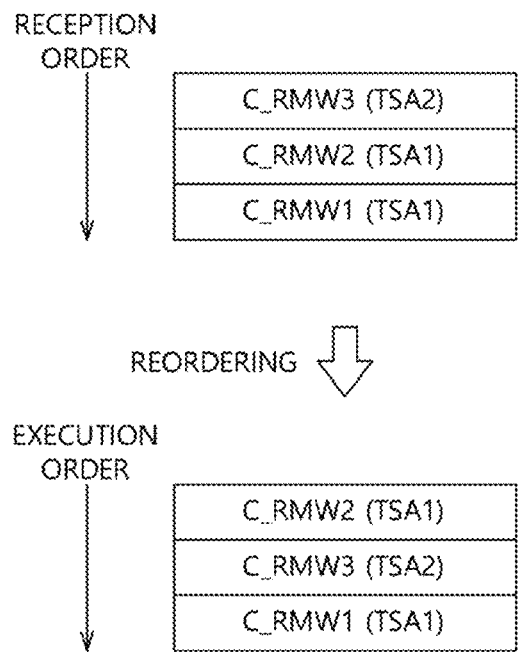
FIG.5A
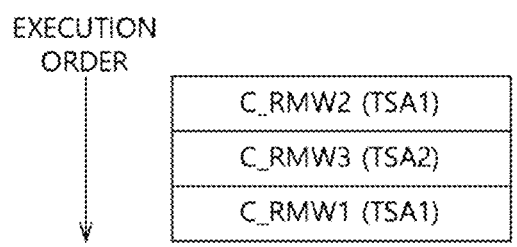
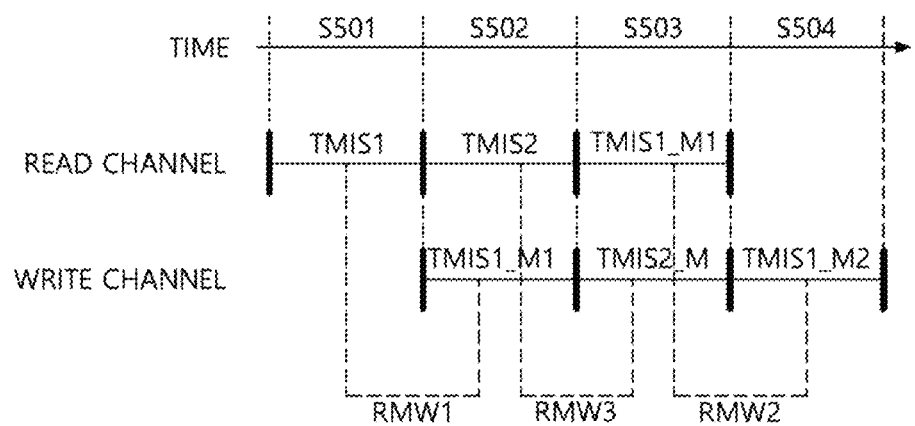

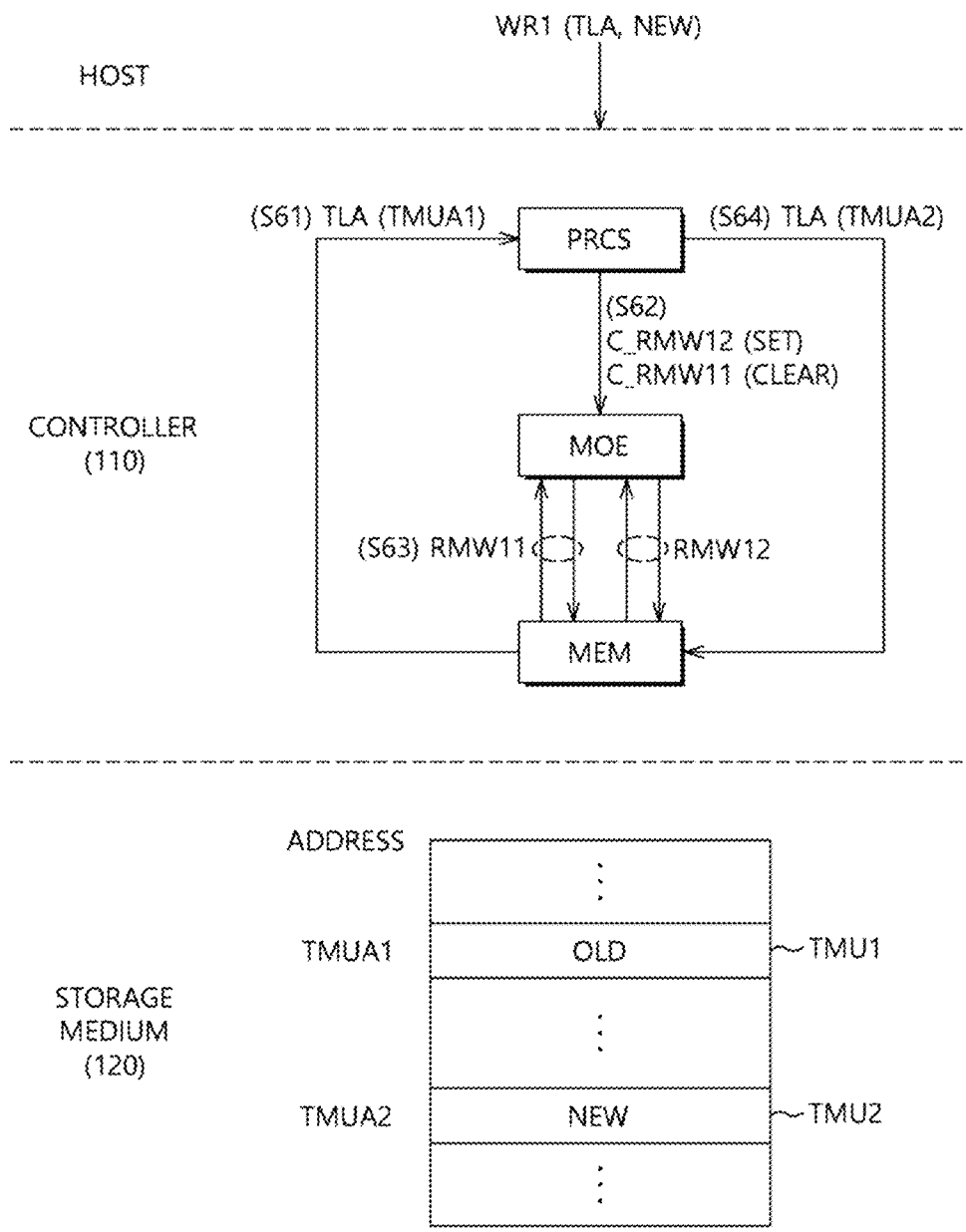

MEMORY SYSTEM

CROSS-REFERENCE TO RELATED APPLICATION

The present application claims priority under 35 U.S.C. § 119(a) to Korean application number 10-2019-0152195, filed on Nov. 25, 2019, in the Korean Intellectual Property Office, which is incorporated herein by reference in its entirety.

BACKGROUND

1. Technical Field

Various embodiments generally relate to a memory system, and more particularly, to a memory system including a nonvolatile memory device.

2. Related Art

A memory system may be configured to store, in response to a write request from a host device, data provided from the host device. Also, the memory system may be configured to provide, in response to a read request from the host device, data stored therein to the host device. The host device may be an electronic device capable of processing data and may include a computer, a digital camera, a mobile phone and so forth. The memory system may be provided within the host device or may be device separate component, in which case the memory system may be operable when coupled to the host device.

SUMMARY

Various embodiments of the present disclosure provides a memory system of which operation performance is improved.

In accordance with an embodiment of the present disclosure, a memory system may include a memory device including a plurality of segments; a processor configured to generate a Read-Modify-Write (RMW) command on a target segment address corresponding to a target segment among the plurality of segments; a scheduler configured to receive the RMW command from the processor and schedule the RMW command; and a RMW unit configured to execute the RMW command on the memory device according to control of the scheduler, wherein the scheduler compares, when a plurality of RMW commands received from the processor are pending, target segment addresses of the plurality of RMW commands to re-order the plurality of RMW commands.

In accordance with an embodiment of the present disclosure, a memory system may include a storage medium including a plurality of memory units; a memory device configured to store management information pieces corresponding to segment addresses, each of the management information pieces including management information on one or more memory units; a processor configured to generate, when an event for a first target memory unit among the plurality of memory units occurs, a first RMW command on a first target segment address among the segment addresses, the first target segment address corresponding to a first target management information piece including management information on the first target memory unit; a memory controller configured to access a second target memory unit among the plurality of memory units according to control of the processor and then generate a second RMW command on a second target segment address among the segment addresses, the second target segment address corresponding to a second target management information piece including management information on the second target memory unit; a scheduler configured to receive the first RMW command and the second RMW command from the processor and the memory controller, respectively, and compare the first target segment address and the second target segment address with each other to schedule the first RMW command and the second RMW command; and a RMW unit configured to execute the first RMW command and the second RMW command on the memory device according to a control of the scheduler.

In accordance with an embodiment of the present disclosure, a memory system may include a storage medium including a plurality of memory units; a memory device configured to store management information pieces corresponding to segment addresses, each of the management information pieces including validity information on one or more memory units; a processor configured to generate a first RMW command on a first target segment address among the segment addresses and a second RMW command on a second target segment address among the segment addresses when new data stored in a first target memory unit is stored into a second target memory unit among the plurality of memory units, the first target segment address corresponding to a first target management information piece including validity information of the data and the second target segment address corresponding to a second target management information piece including validity information of the new data; a memory operation execution unit configured to receive the first RMW command and the second RMW command from the processor, compare the first target segment address and the second target segment address with each other to schedule the first RMW command and the second RMW command, and execute the first RMW command and the second RMW command on the memory device.

In accordance with an embodiment of the present disclosure, a controller for controlling a storage medium including first and second memory units may include a memory suitable for storing at least first and second pieces of information respectively for the first and second memory units; a command generator suitable for sequentially generating first and second Read-Modify-Write (RMW) commands instructing modification of the first piece and a third RMW command instructing modification of the second piece; and a command executor suitable for executing instructions of the first and third RMW commands and then executing instructions of the second RMW commands based on dependency between the first and second RMW commands regarding the first piece.

In accordance with an embodiment of the present disclosure, provided is the memory system of which operation performance is improved.

BRIEF DESCRIPTION OF THE DRAWINGS

Features, aspects and embodiments are described in conjunction with the attached drawings, in which:

FIG. 4 is a diagram exemplarily illustrating a re-ordering method of a scheduler, such as that of FIG. 1, in accordance with an embodiment;

FIG. 5A is a diagram illustrating a method in which a RMW unit executes RMW commands according to a re-ordered execution order in accordance with an embodiment;

FIG. 6 is a diagram illustrating a map update method of a controller, such as that of FIG. 1, in accordance with an embodiment;

DETAILED DESCRIPTION

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Throughout the specification, reference to "an embodiment," "another embodiment" or the like is not necessarily to only one embodiment, and different references to any such phrase are not necessarily to the same embodiment(s).

The drawings are not necessarily to scale and, in some instances, proportions may have been exaggerated in order to clearly illustrate features of the embodiments. The terminology used herein is for the purpose of describing particular embodiments only and is not intended to be limiting of the invention.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, embodiments of the present disclosure are described below with reference to the accompanying drawings.

Figure 1:
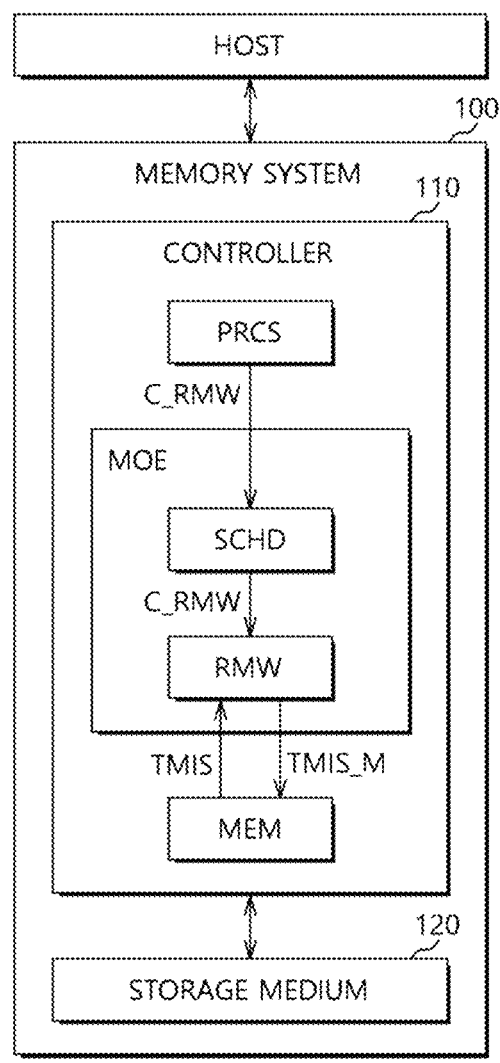
FIG. 1 is a diagram illustrating a memory system in accordance with an embodiment.

FIG. 1 is a diagram illustrating a memory system 100 in accordance with an embodiment of the present disclosure.

The memory system 100 may be configured to store, in response to a write request from an external host (HOST), data provided from the host. Also, the memory system 100 may be configured to provide, in response to a read request from the host, data stored therein to the host.

The memory system 100 may be configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) or the like.

The memory system 100 may include a controller 110 and a storage medium 120.

The memory controller 110 may control general operation of the memory system 100. The memory controller 110 may control the storage medium 120 in order to perform a foreground operation in response to a request from the host. The foreground operation may include an operation of writing data in the storage medium 120 and reading data from the storage medium 120 in response to a request (e.g., a write request or a read request) from the host.

The memory controller 110 may control the storage medium 120 in order to perform a background operation internally necessary and independent of the host. The background operation may include a wear leveling operation, a garbage collection operation, an erase operation, a read reclaim operation, a refresh operation and so forth on the storage medium 120. Like the foreground operation, the background operation may include an operation of writing data in the storage medium 120 and reading data from the storage medium 120.

The controller 110 may include a processor PRCS, a memory operation execution unit MOE and a memory device MEM.

The processor PRCS may control overall operation of the controller 110. The processor PRCS may be implemented by a central processing unit, a microprocessor, a microcontroller or any combination thereof. Although FIG. 1 exemplifies that the memory system 100 includes one processor PRCS, the memory system 100 may include a plurality of processors for high-speed operation, as is described with reference to FIG. 7.

In accordance with an embodiment, the processor PRCS may direct the memory operation execution unit MOE to perform a READ-MODIFY-WRITE (RMW) operation on the memory device MEM.

Specifically, the processor PRCS may provide a RMW command C_RMW to the memory operation execution unit MOE in order to direct the memory operation execution unit MOE to perform a RMW operation.

The RMW command C_RMW may include a target segment address (information thereof), a modification location and a modification mode. The target segment address may indicate a target management information piece TMIS to be read from the memory device MEM to the memory operation execution unit MOE. The target management information piece TMIS may include a value to be modified by the memory operation execution unit MOE. The modification location may indicate a location of a value to be modified within the target management information piece TMIS. The modification mode may indicate a particular modification method, for example, bit clear, bit set, count increase, or count decrease.

That is, when it is required to modify a value stored in the memory device MEM through the RMW scheme according to operation characteristics of the processor PRCS and the memory device MEM, the processor PRCS may first provide a read command of the RMW operation to the memory device MEM in order to directly perform the RMW operation. Then, the processor PRCS may be in a stall state until receiving the target management information piece TMIS from the memory device MEM. Further, as will be described with reference to FIG. 2, since the RMW operation is performed in order to modify management information stored in the memory device MEM and most of such RMW operation is a background operation, the RMW operation may be high overhead to the processor PRCS. In accordance with an embodiment, the processor PRCS may entrust the memory operation execution unit MOE with performing of the RMW operation through the RMW command C_RMW and thus the overhead of the RMW operation with respect to the processor PRCS may be eliminated or reduced and thus the performance of the memory system 100 may be drastically improved.

The memory operation execution unit MOE may receive the RMW command C_RMW from the processor PRCS and schedule the received RMW command C_RMW to perform the RMW operation to the memory device MEM. When receiving the RMW command C_RMW from the processor PRCS, the memory operation execution unit MOE may immediately provide the processor PRCS with a RMW completion report.

The memory operation execution unit MOE may include a scheduler SCHD and a RMW unit RMW.

The scheduler SCHD may receive the RMW command C_RMW from the processor PRCS and may determine an execution order of the RMW command C_RMW based on the target segment address included in the RMW command C_RMW. Also, the scheduler SCHD may control the RMW unit RMW to execute the RMW command C_RMW according to the execution order.

Specifically, the scheduler SCHD may receive, when a first RMW command is pending, a second RMW command having address dependency to the first RMW command and a third RMW command not having address dependency to the first RMW command. A RMW command having address dependency to a previous RMW command may have the same target segment address as the previous RMW command.

In the above example, the scheduler SCHD may control the RMW unit RMW to execute the third RMW command prior to the second RMW command. Also, the scheduler SCHD may control the RMW unit RMW to execute the second RMW command after completing execution of the first RMW command. The execution completion of the first RMW command may mean completion of writing the target management information piece TMIS, which is modified according to the first RMW command, into the memory device MEM.

As described below, the second RMW command having address dependency to the first RMW command should not be executed in parallel with the first RMW command and should be executed after the execution completion of the first RMW command, in order to ensure data integrity. On the other hand, the third RMW command not having address dependency to the first RMW command may be executed regardless of the execution of the first RMW command and may be executed even in parallel with the first RMW command. Therefore, according to an embodiment, the scheduler SCHD may re-order the RMW commands C_RMW, which are received from the processor PRCS and pending, to be processed out-of-order. Eventually, resources may be fully utilized without any pending status and overall execution time may be reduced.

The RMW unit RMW may perform a RMW operation to the memory device MEM based on the RMW command C_RMW under the control the scheduler SCHD. The RMW unit RMW may perform the RMW operation based on the target segment address, the modification location and the modification mode included in the RMW command C_RMW.

In detail, the RMW unit RMW may read a target management information piece TMIS, which corresponds to the target segment address, from the memory device MEM. The RMW unit RMW may modify a value, which corresponds to the modification location within the target management information piece TMIS, according to the modification mode. The RMW unit RMW may write a modified target management information piece TMIS_M, which includes the modified value, into the memory device MEM.

The memory device MEM may be utilized as an operation memory for the processor PRCS. The memory device MEM may be configured to store a software program, which is to be executed by the processor PRCS, and various kinds of management data (e.g., management data described with reference to FIG. 2) of the storage medium 120, which is managed by the processor PRCS.

According to an embodiment, the memory device MEM may be configured to temporarily store, as a buffer, data that is transferred between the host and the storage medium 120. According to an embodiment, the memory device MEM may be configured to cache, as a cache, data stored in the storage medium 120.

The memory device MEM may include one or more volatile memory devices. The volatile memory devices may include a Static Random Access Memory (SRAM), a Dynamic Random Access Memory (DRAM), and the like.

The storage medium 120 may store therein data transferred from the controller 110 under the control of the controller 110. The storage medium 120 may read data therefrom and provide the read data to the controller 110 under the control of the controller 110.

The storage medium 120 may include one or more nonvolatile memory devices. The nonvolatile memory devices may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

Figure 2:
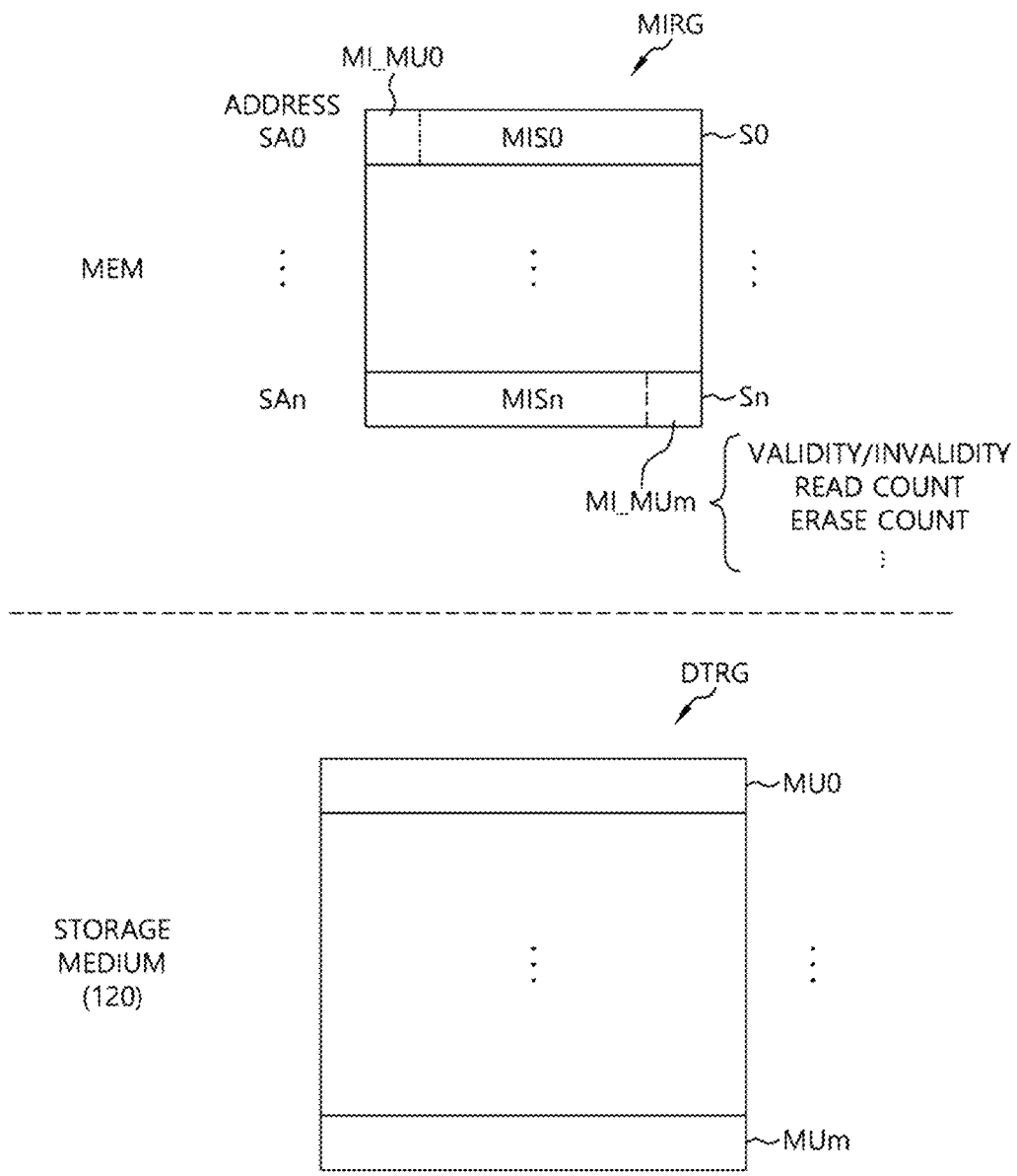
FIG. 2 is a diagram illustrating a management information region included in a memory device of FIG. 1 in accordance with an embodiment.

FIG. 2 is a diagram illustrating a management information region MIRG included in the memory device MEM of FIG. 1 in accordance with an embodiment.

Referring to FIG. 2, the memory device MEM may include the management information region MIRG. The management information region MIRG may include segments S0 to Sn. The segments S0 to Sn may store management information pieces MIS0 to MISn, respectively. Segment addresses SA0 to SAn may correspond to the segments S0 to Sn or the management information pieces MIS0 to MISn, respectively.

The storage medium 120 may include data region DTRG. The data region DTRG may store data through a foreground operation and a background operation of the controller 110.

The data region DTRG may include memory units MU0 to Mum. A memory unit may be a unit to which the storage medium 120 performs a read operation, a write operation or an erase operation. However, the present invention is not limited to this specific memory unit; a memory unit can be defined by various criteria.

The management information region MIRG of the memory device MEM may be utilized to store the management information on the memory units MU0 to Mum included in the storage medium 120. Each of the management information pieces MIS0 to MISn may include the management information on one or more memory units. For example, management information MI_MU0 included in the management information piece MIS0 may be of the memory unit MU0 and management information MI_MUn included in the management information piece MISn may be of the memory unit MUm.

For example, the management information on a memory unit may include information of validity or invalidity of data stored in the memory unit. In detail, when the storage medium 120 does not support the overwrite scheme, an updated version of data stored in a first memory unit of the storage medium 120 may be stored in an empty second memory unit. In this case, the old data stored in the first memory unit may become invalid data and the new data stored in the second memory unit may become valid data. Therefore, the management information on the first memory unit may include information that the old data stored in the first memory unit is invalid. Also, the management information on the second memory unit may include information that the new data stored in the second memory unit is valid.

In accordance with an embodiment, the management information on a memory unit may include a count of the number of times a read operation has been performed on the memory unit, i.e., a read count. Whenever the controller 110 performs a read operation on a memory unit, the read count of the memory unit may be increased by one.

In accordance with an embodiment, the management information on a memory unit may include a count of the number of times an erase operation has been performed on the memory unit, i.e., an erase count. Whenever the controller 110 performs an erase operation on a memory unit, the erase count of the memory unit may be increased by one.

In accordance with an embodiment, the management information on a memory unit may include plural pieces of different kinds of management information on the memory unit.

In accordance with an embodiment, the plural pieces of different kinds of management information on a memory unit may be separated from one another and the separated pieces of management information may be respectively stored in different management information regions. For example, the memory device MEM may include a validity information region, a read count information region and an erase count information region, which are separated from one another.

Figure 3:
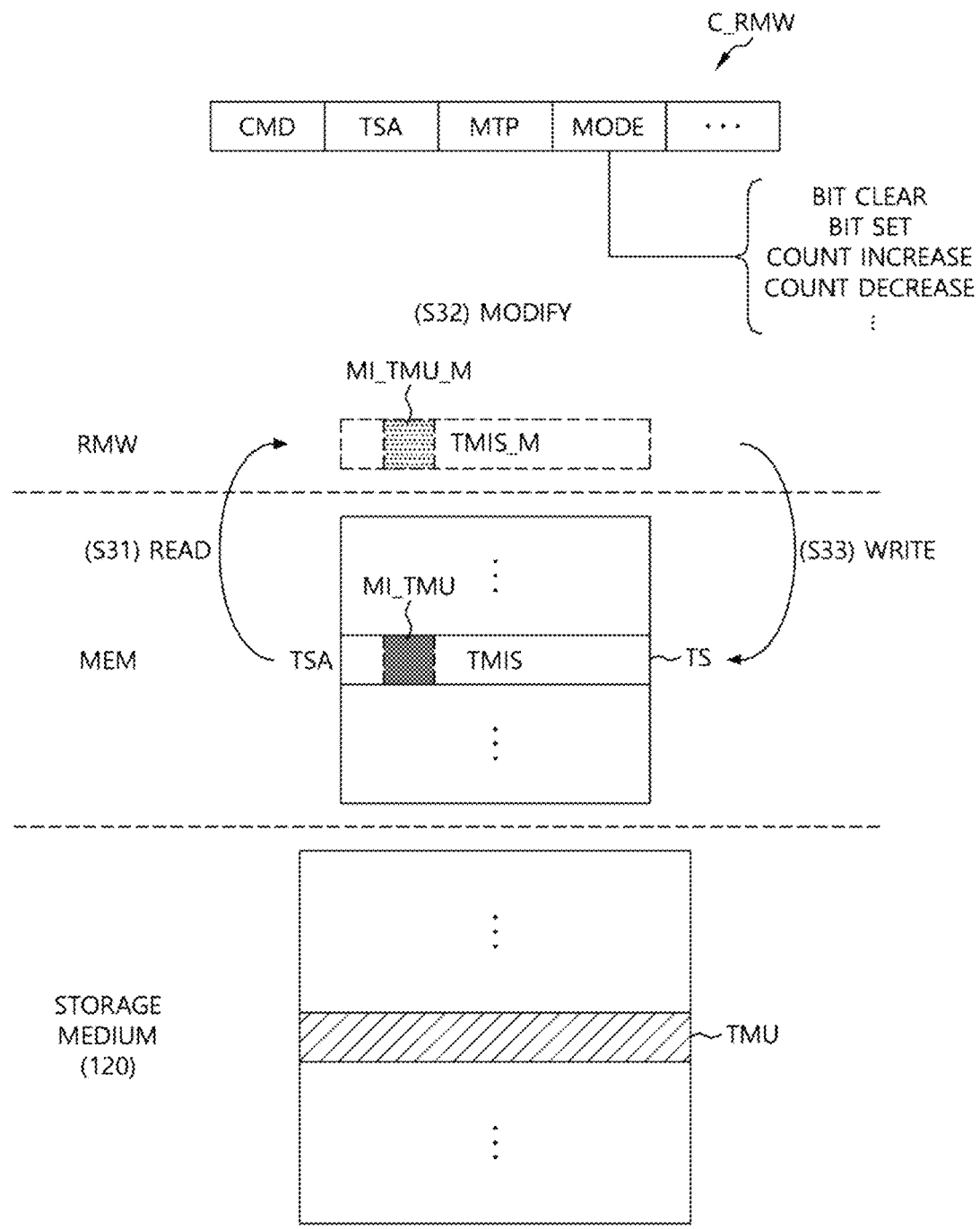
FIG. 3 is a diagram illustrating a method in which a Read-Modify-Write (RMW) unit, such as that of FIG. 1, performs a RMW operation on a memory device in accordance with an embodiment.

FIG. 3 is a diagram illustrating a method in which the RMW unit RMW of FIG. 1 performs a RMW operation on the memory device MEM in accordance with an embodiment.

Referring to FIG. 3, an event may occur, in response to which the management information on a target memory unit TMU within the storage medium 120 is required to be modified. For example, data stored in the target memory unit TMU may become invalid. For example, valid data may be stored in the target memory unit TMU that is empty. For example, a read operation or an erase operation may be performed on the target memory unit TMU.

In response to occurrence of an event on a target memory unit TMU, the processor PRCS may generate a RMW command C_RMW and provide the RMW command C_RMW to the memory operation execution unit MOE in order to modify a management information MI_TMU of the target memory unit TMU.

The RMW command C_RMW may include a control command CMD indicative of the RMW command C_RMW and information of a target segment address TSA, a modification location MTP and a modification mode MODE.

The target segment address TSA may correspond to the target management information piece TMIS to be read from the memory device MEM to the RMW unit RMW. The target segment address TSA may correspond to a target segment TS, in which the target management information piece TMIS is stored. The modification location MTP may mean a location of the management information MI_TMU to be modified within the target management information piece TMIS. The modification mode MODE may indicate a particular modification method (for example, bit clear, bit set, count increase, or count decrease) to be performed on the management information MI_TMU of the modification location MTP.

The RMW unit RMW may perform a RMW operation on the target segment address TSA of the memory device MEM based on the RMW command C_RMW.

In detail, the RMW unit RMW may read a target management information piece TMIS from a target segment TS corresponding to a target segment address TSA in step S31.

In step S32, the RMW unit RMW may modify a management information MI_TMU included in the target management information piece TMIS based on a modification location MTP and a modification mode MODE.

For example, the RMW unit RMW may clear, when data stored in a target memory unit TMU becomes invalid, a validity bit within the management information MI_TMU. For example, the RMW unit RMW may set, when valid data is stored into a target memory unit TMU that is empty, a validity bit within the management information MI_TMU. For example, the RMW unit RMW may increase, when a read operation is performed on a target memory unit TMU, a read count within the management information MI_TMU. For example, the RMW unit RMW may increase, when an erase operation is performed on a target memory unit TMU, an erase count within the management information MI_TMU.

In step S33, the RMW unit RMW may write a modified target management information piece TMIS_M, which includes the modified management information MI_T-MU_M, into the memory device MEM.

For example, the RMW unit RMW may drive, when it operates according to the Advanced eXtensible Interface (AXI) protocol of the Advanced Microcontroller Bus Architecture (AMBA) bus, a write channel and a read channel in parallel. In this case, the RMW unit RMW may perform a write operation and a read operation in parallel on different target segment addresses that do not have address dependency to one another, through the write channel and the read channel. In order for the RMW unit RMW to perform such operation, the scheduler SCHD may re-order a plurality of RMW commands to be processed out-of-order based on target segment addresses of the RMW commands, which is described with reference to FIG. 4.

FIG. 4 is a diagram exemplarily illustrating a re-ordering method of the scheduler SCHD of FIG. 1 in accordance with an embodiment.

Referring to FIG. 4, the scheduler SCHD may sequentially receive first to third RMW commands C_RMW1 to C_RMW3 from the processor PRCS. The scheduler SCHD may determine an execution order of the first to third RMW commands C_RMW1 to C_RMW3 and may control the RMW unit RMW to execute the first to third RMW commands C_RMW1 to C_RMW3 according to the execution order.

In detail, the scheduler SCHD may determine the execution order according to the dependency of the target segment addresses included in the first to third RMW commands C_RMW1 to C_RMW3.

For example, the second RMW command C_RMW2 may be associated with the same target segment address TSA1 as the first RMW command C_RMW1 and thus may have address dependency to the first RMW command C_RMW1. Therefore, the second RMW command C_RMW2 should be executed after the execution completion of a RMW operation in respond to the first RMW command C_RMW1, in order to ensure integrity of data of the target segment address TSA1. Therefore, the second RMW command C_RMW2 should not be executed in parallel with the first RMW command C_RMW1.

On the other hand, the third RMW command C_RMW3 may be associated with target segment address TSA2 and thus may not have address dependency to the first RMW command C_RMW1. Therefore, the third RMW command C_RMW3 may be executed independently of the first RMW command C_RMW1 and regardless of whether or not execution of the first RMW command C_RMW1 is completed. The third RMW command C_RMW3 may be executed in parallel with the first RMW command C_RMW1.

Therefore, the scheduler SCHD may determine the execution order such that the third RMW command C_RMW3 is to be executed prior to the second RMW command C_RMW2. As described with reference to FIG. 5A, the scheduler SCHD may control the RMW unit is RMW to execute the third RMW command C_RMW3 partially in parallel with the first RMW command C_RMW1 and execute the second RMW command C_RMW2 after the first RMW command C_RMW1 is executed.

Figure 5B:
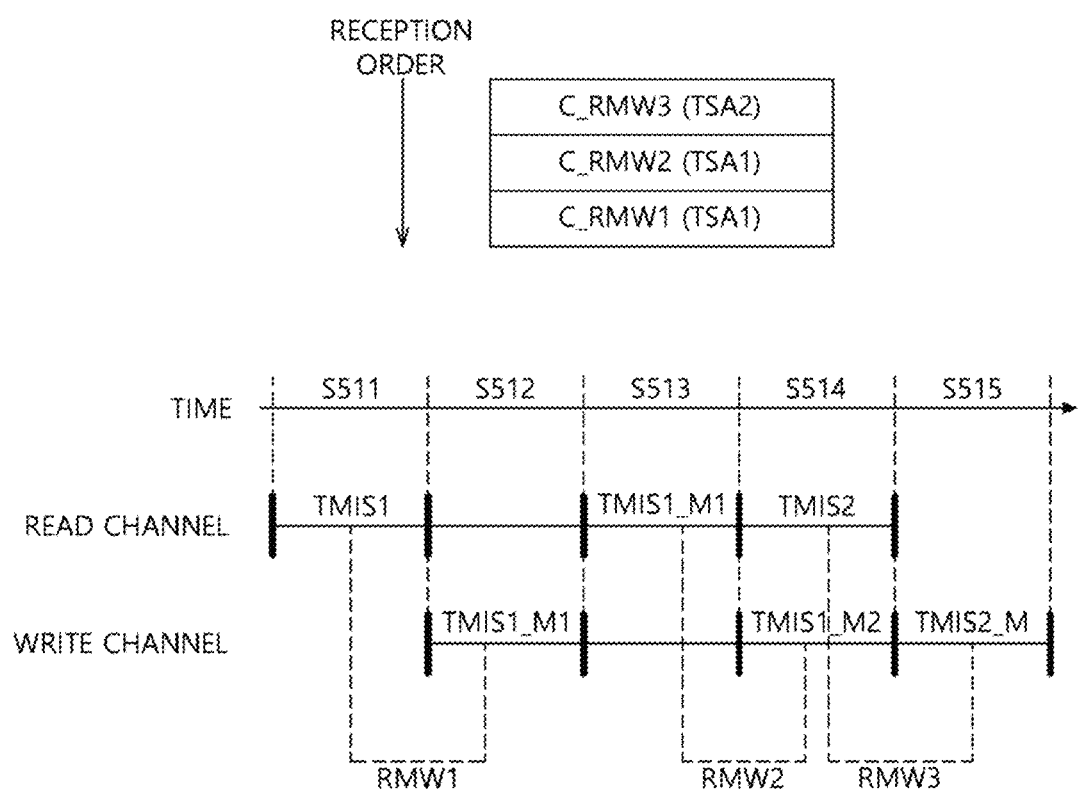
FIG. 5B is a diagram illustrating a method in which a RMW unit executes RMW commands according to a reception order for comparing with the method of FIG. 5A.

FIG. 5A is a diagram illustrating a method in which the RMW unit RMW executes RMW commands C_RMW1 to C_RMW3 according to a re-ordered execution order in accordance with an embodiment. FIG. 5B is a diagram illustrating a method in which the RMW unit executes the RMW commands C_RMW1 to C_RMW3 according to a reception order for comparison with the method of FIG. 5A.

Referring to FIG. 5A, the RMW unit RMW may execute the first to third RMW commands C_RMW1 to C_RMW3 according to the execution order that is, for example, determined as described with reference to FIG. 4.

In time periods S501 and S502, the RMW unit RMW may perform a first RMW operation RMW1 based on the first RMW command C_RMW1.

In detail, in time period S501, the RMW unit RMW may read the target management information piece TMIS1 of the first RMW command C_RMW1 from the memory device MEM through a read channel. The target management information piece TMIS1 may correspond to the target segment address TSA1 of the first RMW command C_RMW1. Although not illustrated, the RMW unit RMW may modify management information within the target management information piece TMIS1.

In time period S502, the RMW unit RMW may write the modified target management information piece TMIS1_M1 into the memory device MEM through a write channel.

In time periods S502 and S503, the RMW unit RMW may perform a third RMW operation RMW3 based on the third RMW command C_RMW3.

In detail, in time period S502, the RMW unit RMW may read the target management information piece TMIS2 of the third RMW command C_RMW3 from the memory device MEM through a read channel. The target management information piece TMIS2 may correspond to the target segment address TSA2 of the third RMW command C_RMW3. That is, the RMW unit RMW may perform in parallel the write operation of the first RMW operation RMW1 and the read operation of the third RMW operation RMW3 for the target segment addresses TSA1 and TSA2, which are different from each other, through the separated write channel and read channel. The RMW unit RMW may modify management information within the target management information piece TMIS2.

In time period S503, the RMW unit RMW may write the modified target management information piece TMIS2_M into the memory device MEM through the write channel.

In time periods S503 and S504, the RMW unit RMW may perform a second RMW operation RMW2 based on the second RMW command C_RMW2.

In detail, in time period S503, since the first RMW operation RMW1 is completed and the read channel is available, the RMW unit is RMW may read the modified target management information piece TMIS1_M1 of the second RMW command C_RMW2 from the memory device MEM through the read channel. The RMW unit RMW may modify the management information within the modified target management information piece TMIS1_M1.

In time period S504, the RMW unit RMW may write the modified target management information piece TMIS1_M2 into the memory device MEM through the write channel.

Referring to FIG. 5B, the RMW unit RMW may execute the first to third RMW commands C_RMW1 to C_RMW3 according to the reception order.

In time periods S511 and S512, the RMW unit RMW may perform a first RMW operation RMW1 based on the first RMW command C_RMW1.

In detail, in time period S511, the RMW unit RMW may read the target management information piece TMIS1 of the first RMW command C_RMW1 from the memory device MEM through a read channel. The target management information piece TMIS1 may correspond to the target segment address TSA1 of the first RMW command C_RMW1. The RMW unit RMW may modify management information within the target management information piece TMIS1.

In time period S512, the RMW unit RMW may write the modified target management information piece TMIS1_M1 into the memory device MEM through a write channel.

After execution completion of the first RMW operation RMW1, in time periods S513 and S514, the RMW unit RMW may perform a second RMW operation RMW2 based on the second RMW command C_RMW2.

In detail, in time period S513, the RMW unit RMW may read the modified target management information piece TMIS1_M1 of the second RMW command C_RMW2 from the memory device MEM through a read channel. The RMW unit RMW may modify management information within the modified target management information piece TMIS1_M1.

In time period S514, the RMW unit RMW may write the modified target management information piece TMIS1_M2 into the memory device MEM through the write channel.

In time periods S514 and S515, the RMW unit RMW may perform a third RMW operation RMW3 based on the third RMW command C_RMW3.

In detail, in time period S514, since the read channel is available, the RMW unit RMW may read the target management information piece TMIS2 of the third RMW command C_RMW3 from the memory device MEM through the read channel. The target management information piece TMIS2 may correspond to the target segment address TSA2 of the third RMW command C_RMW3. That is, the RMW unit RMW may perform in parallel the write operation of the second RMW operation RMW2 and the read operation of the third RMW operation RMW3 for the target segment addresses TSA1 and TSA2, which are different from each other, through the separated write channel and read channel. The RMW unit RMW may modify the management information within the target management information piece TMIS2.

In time period S515, the RMW unit RMW may write the modified target management information piece TMIS2_M into the memory device MEM through the write channel.

In summary, comparing the operations of FIGS. 5A and 5B, the overall operation time of the first to third RMW operations RMW1 to RMW3 may be reduced. That is, in accordance with an embodiment, resources may be fully utilized and the overall execution time may be reduced since the scheduler SCHD re-orders the plurality of RMW commands to be processed out-of-order.

FIG. 6 is a diagram illustrating a map update method of the controller 110 of FIG. 1 in accordance with an embodiment.

Referring to FIG. 6, the controller 110 may receive a write request WR1 for new data NEW corresponding to a target logical address TLA from the host. The controller 110 may write the new data NEW into a second target memory unit TMU2 of the storage medium 120. The controller 110 may perform a map update operation for the write request WR1 in a way as described below.

In step S61, the processor PRCS may read an address TMUA1 of a first target memory unit TMU1, which is mapped to the target logical address TLA, from the memory device MEM. For example, the target logical address TLA may indicate a particular location within a map data region (not illustrated) included in the memory device MEM. The processor PRCS may read the address TMUA1 of the first target memory unit TMU1 stored in the particular location. The first target memory unit TMU1 may be storing old data OLD of the target logical address TLA.

In step S62, the processor PRCS may provide RMW commands C_RMW11 and C_RMW12 to the memory operation execution unit MOE. The RMW command C_RMW11 may instruct that a validity bit of the first target memory unit TMU1 be cleared and the RMW command C_RMW12 may instruct that a validity bit of the second target memory unit TMU2 be set. The RMW commands C_RMW11 and C_RMW12 may be generated as described with reference to FIG. 3.

In step S63, the memory operation execution unit MOE may schedule the RMW commands C_RMW11 and C_RMW12 and may execute the RMW commands C_RMW11 and C_RMW12 on the memory device MEM. In detail, the memory operation execution unit MOE may determine address dependency of RMW commands that are already pending (not illustrated) and the RMW commands C_RMW11 and C_RMW12 by comparing the target segment addresses of the pending RMW commands and the RMW commands C_RMW11 and C_RMW12, in order to determine the execution order of the RMW commands C_RMW11 and C_RMW12. The memory operation execution unit MOE may perform RMW operations RMW11 and RMW12 respectively based on the RMW commands C_RMW11 and C_RMW12. The RMW commands C_RMW11 and C_RMW12 may be executed as described with reference to FIGS. 4 and 5A.

In step S64, the processor PRCS may write the address TMUA2 of the second target memory unit TMU2 into the particular location indicated by the target logical address TLA within the map data region of the memory device MEM.

In accordance with an embodiment, step S64 may be performed prior to step S62, which is different than illustrated in FIG. 6.

In summary, the map update operations may require plural accesses to the memory device MEM. However, in accordance with an embodiment, the processor PRCS may control the memory operation execution unit MOE to perform the RMW operations RMW11 and RMW12, which require a relatively long execution time among the map update operations, thereby eliminating or drastically reducing overhead of the map update operations.

Figure 7:
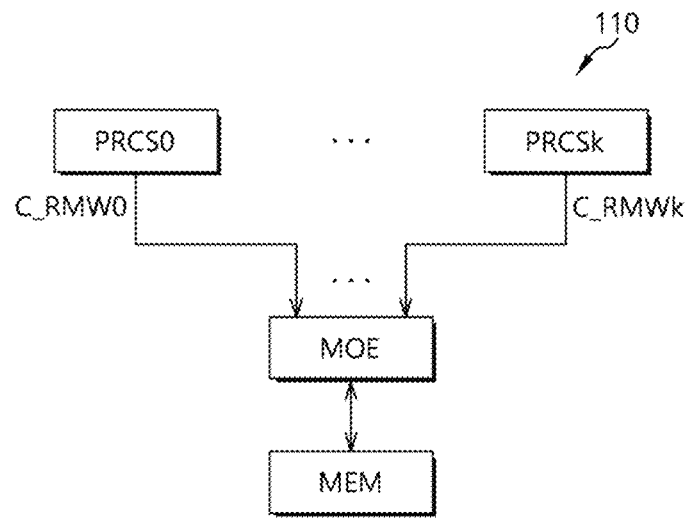
FIG. 7 is a diagram illustrating a method in which a plurality of processors process RMW commands in accordance with an embodiment.

FIG. 7 is a diagram illustrating a method in which a plurality of processors PRCS0 to PRCSk process RMW commands C_RMW0 to C_RMWk in accordance with an embodiment.

Referring to FIG. 7, the controller 110 may include the plurality of processors PRCS0 to PRCSk. Each of the plurality of processors PRCS0 to PRCSk may independently provide the RMW commands C_RMW0 to C_RMWk to the memory operation execution unit MOE. Even when the RMW commands C_RMW0 to C_RMWk are provided in parallel, the memory operation execution unit MOE may schedule the RMW commands C_RMW0 to C_RMWk and may execute the RMW commands C_RMW0 to C_RMWk on the memory device MEM according to the method as described above.

In general, when required to directly access the memory device MEM for the RMW operation, the plurality of processors PRCS0 to PRCSk may lock one another for the data integrity. However, in accordance with an embodiment, the memory operation execution unit MOE may provide the lock-free environment to the plurality of processors PRCS0 to PRCSk, which may maximize the operation performance of the memory device MEM.

Figure 8:
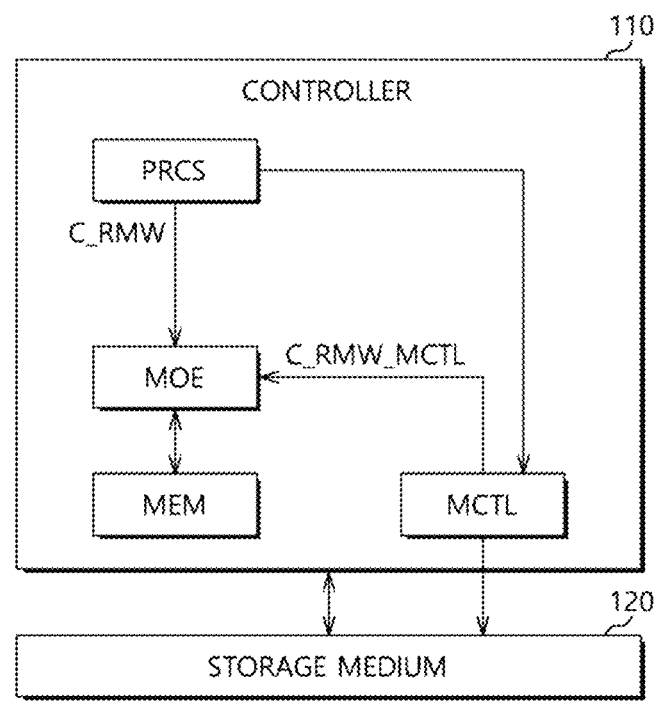
FIG. 8 is a diagram illustrating a method in which a processor and a memory controller process RMW commands in accordance with an embodiment.

FIG. 8 is a diagram illustrating a method in which a processor PRCS and a memory controller MCTL process RMW commands C_RMW and C_RMW_MCTL in accordance with an embodiment.

Referring to FIG. 8, the memory system 100 may further include the memory controller MCTL.

The memory controller MCTL may control the storage medium 120 under the control of the processor PRCS. The memory controller MCTL may perform, under the control of the processor PRCS, a write operation, a read operation, an erase operation and so forth on a target memory unit within the storage medium 120. Therefore, the memory controller MCTL may directly provide the RMW command C_RMW_MCTL to the memory operation execution unit MOE in order to update the management information for the target memory unit after the write operation, the read operation, the erase operation or other operation on the target memory unit.

In this case, the processor PRCS and the memory controller MCTL may provide the RMW commands C_RMW and C_RMW_MCTL to the memory operation execution unit MOE, respectively. For example, the RMW command C_RMW of the processor PRCS may be for modification of the validity information and the RMW command C_RMW_MCTL of the memory controller MCTL may be for increase of the read count. In accordance with an embodiment, even when the processor PRCS and the memory controller MCTL provide the RMW commands C_RMW and C_RMW_MCTL in parallel to the memory operation execution unit MOE, the memory operation execution unit MOE may schedule the RMW commands C_RMW and C_RMW_MCTL and may execute the RMW commands C_RMW and C_RMW_MCTL on the memory device MEM according to the method as described above.

That is, as described with reference to FIG. 7, the memory operation execution unit MOE may effectively execute, while ensuring the data integrity, the RMW commands C_RMW and C_RMW_MCTL of the processor PRCS and the memory controller MCTL of different layers or different pipelines as well as the RMW commands C_RMW0 to C_RMWk of the processors PRCS0 to PRCSk of the same layers.

In accordance with an embodiment, the controller 110 may include a plurality of processors and a plurality of memory controllers. In this case, the memory operation execution unit MOE may schedule a plurality of RMW commands, which are issued from the plurality of processors and the plurality of memory controllers and may execute the plurality of RMW commands.

Figure 9:
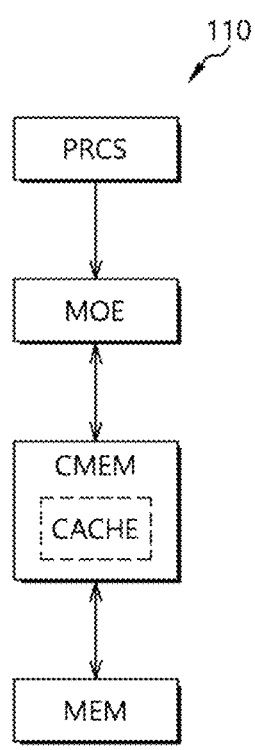
FIG. 9 is a diagram illustrating a controller in accordance with an embodiment.

FIG. 9 is a diagram illustrating the controller 110 in accordance with an embodiment.

Referring to FIG. 9, the controller 110 may further include a cache memory CMEM.

The cache memory CMEM may be provided between the memory operation execution unit MOE and the memory device MEM. The cache memory CMEM may cache a part, as cache data CACHE, among the management information pieces MIS0 to MISn stored in the memory device MEM (see FIG. 2). The memory operation execution unit MOE may similarly perform the above-described RMW operation RMW on the cache memory CMEM.

In detail, the cache memory CMEM may provide, when a read command of the RMW operation is received from the memory operation execution unit MOE and the target management information piece is included in the cache data CACHE (i.e., in a case of a cache hit), the target management information piece to the memory operation execution unit MOE. On the other hand, the cache memory CMEM may provide, when the read command of the RMW operation is received from the memory operation execution unit MOE but the target management information piece is not included in the cache data CACHE (i.e., in a case of a cache miss), the read command of the RMW operation to the memory device MEM.

The cache memory CMEM may include a memory capable of operate with a faster speed than the memory device MEM. Therefore, in accordance with an embodiment, the RMW operation performance of the memory operation execution unit MOE may be further improved through the introduction of the cache memory CMEM.

Especially, when the host provides a sequential write request, sequential data may be stored in sequential target memory units within the storage medium 120. In this case, the management information on the target memory units, of which validity bits are supposed to be set, may have a great probability to be included in the same target management information piece. Therefore, when the cache memory CMEM is caching the corresponding target management information piece, the corresponding target management information piece may be continuously provided from the cache memory CMEM. As a result, the performance of the map update operation of the sequential write operation may be improved.

In accordance with an embodiment, the cache memory CMEM may be provided within the memory operation execution unit MOE, which is different than illustrated in FIG. 9.

Figure 10:
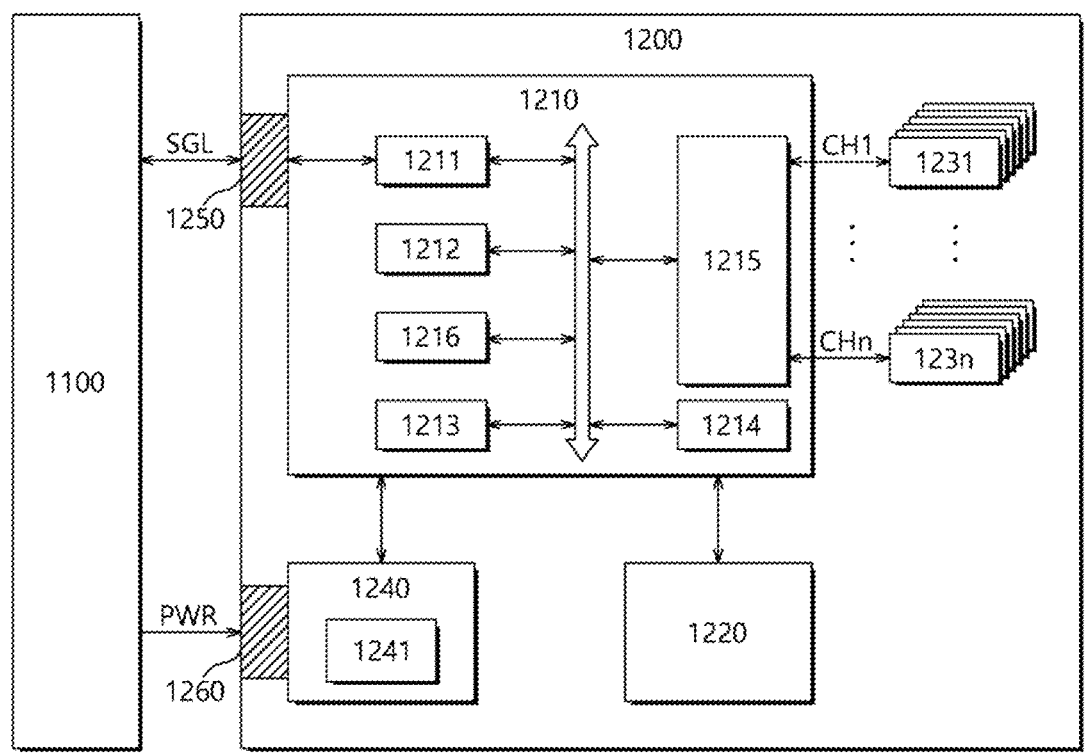
FIG. 10 is a diagram illustrating a data processing system including a solid state drive (SSD) in accordance with an embodiment.

FIG. 10 is a diagram illustrating a data processing system 1000 including a solid state drive (SSD) 1200 in accordance with an embodiment. Referring to FIG. 10, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operation of the SSD 1200. The controller 1210 may include a host interface unit 1211, a control unit 1212, a random access memory 1213, an error correction code (ECC) unit 1214, a memory interface unit 1215, and the memory operation execution unit 1216.

The host interface unit 1211 may exchange a signal SGL with the host device 1100 through the signal connector 1250. The signal SGL may include a command, an address, data, and the like. The host interface unit 1211 may interface the host device 1100 and the SSD 1200 according to the protocol of the host device 1100. For example, the host interface unit 1211 may communicate with the host device 1100 through any of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and/or universal flash storage (UFS).

The control unit 1212 may analyze and process the signal SGL received from the host device 1100. The control unit 1212 may control operations of internal function blocks according to firmware or software for driving the SSD 1200. The control unit 1212 may be configured in the same manner as the processor PRCS shown in FIG. 1.

The memory operation execution unit 1216 may be configured in the same manner as the memory operation execution unit MOE shown in FIG. 1.

The random access memory 1213 may be used as a working memory for driving such firmware or software. The random access memory 1213 may correspond to the memory device MEM shown in FIG. 1.

The ECC unit 1214 may generate parity data of data to be transmitted to at least one of the nonvolatile memory devices 1231 to 123n. The generated parity data may be stored together with the data in the nonvolatile memory devices 1231 to 123n. The ECC unit 1214 may detect error(s) in the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210. According to an embodiment, the random access memory 1213 may be used as a buffer memory instead of the buffer memory device 1220.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to the same channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be properly terminated when a sudden power-off occurs. The auxiliary power supply 1241 may include large capacity capacitors.

The signal connector 1250 may be configured as any of various types of connectors depending on an interface scheme between the host device 1100 and the SSD 1200.

The power connector 1260 may be configured as any of various types of connectors depending on a power supply scheme of the host device 1100.

Figure 11:
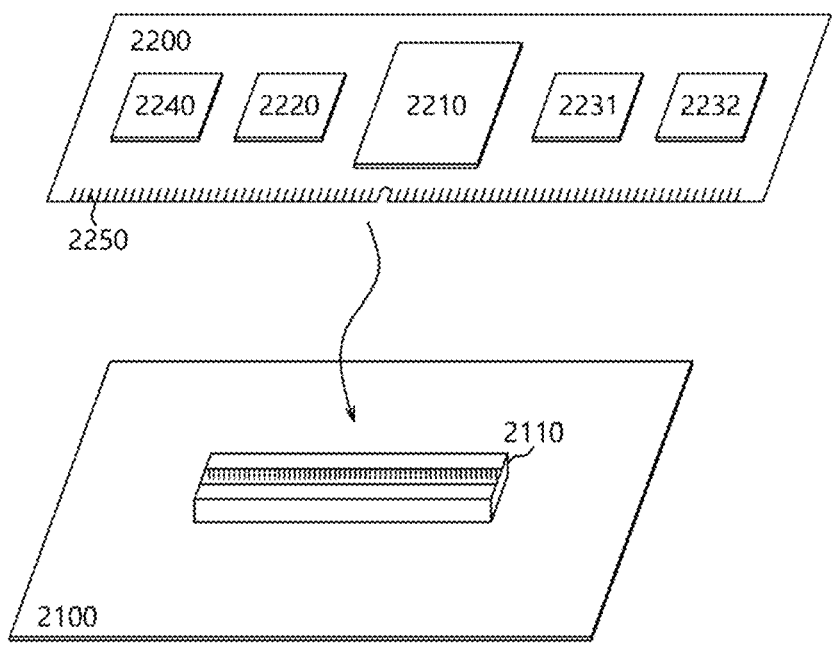
FIG. 11 is a diagram illustrating a data processing system including a memory system in accordance with an embodiment.

FIG. 11 is a diagram illustrating a data processing system 2000 including a memory system 2200 in accordance with an embodiment. Referring to FIG. 11, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operation of the memory system 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured as any of various types depending on an interface scheme between the host device 2100 and the memory system 2200. The connection terminal 2250 may be disposed on or in any side of the memory system 2200.

Figure 12:
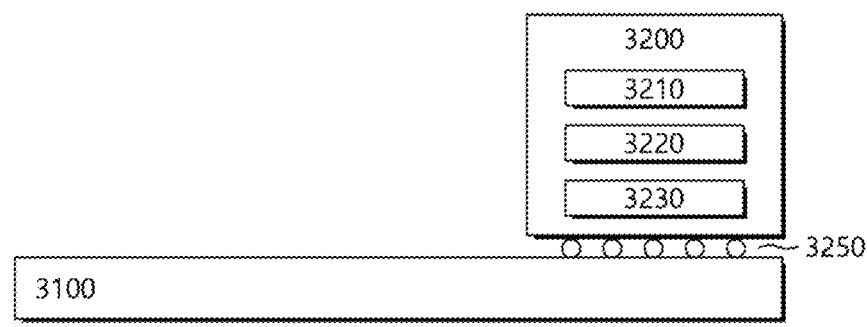
FIG. 12 is a diagram illustrating a data processing system including a memory system in accordance with an embodiment.

FIG. 12 is a diagram illustrating a data processing system 3000 including a memory system 3200 in accordance with an embodiment. Referring to FIG. 12, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operation of the memory system 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 13:
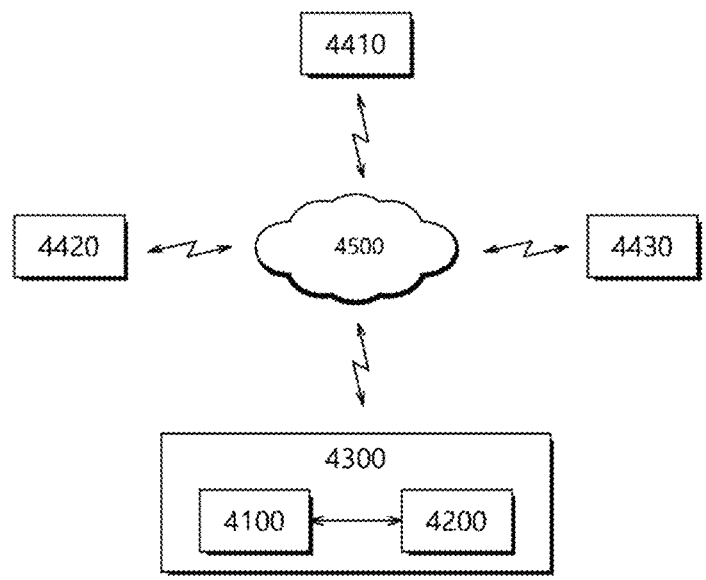
FIG. 13 is a diagram illustrating a network system including a memory system in accordance with an embodiment.

FIG. 13 is a diagram illustrating a network system 4000 including a memory system 4200 in accordance with an embodiment. Referring to FIG. 13, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 10, the memory system 2200 shown in FIG. 11 or the memory system 3200 shown in FIG. 12.

Figure 14:
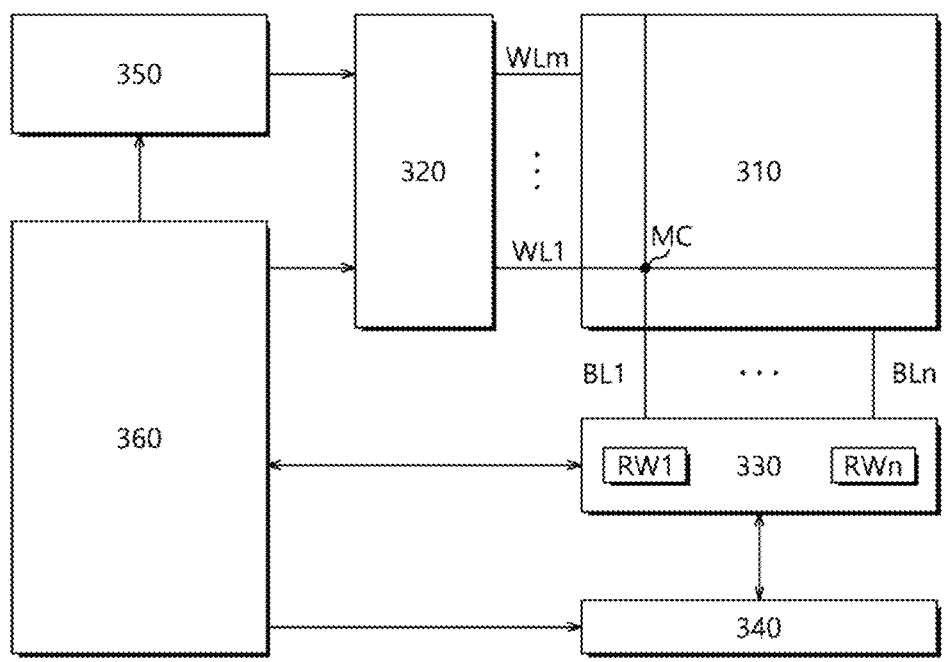
FIG. 14 is a block diagram illustrating a nonvolatile memory device included in a memory system in accordance with an embodiment.

FIG. 14 is a block diagram illustrating a nonvolatile memory device 300 included in a memory system in accordance with an embodiment. Referring to FIG. 14, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operation of the nonvolatile memory device 300, based on control signals provided from the external device. For example, the control logic 360 may control operations of the nonvolatile memory device 300 such as read, write and erase operations of the nonvolatile memory device 300.

The term "unit" is not intended to invoke means-plus-function interpretation. Any "unit" element may be implemented by suitable hardware or combination of hardware and software.

While certain embodiments have been illustrated and described, it will be understood to those skilled in the art that the embodiments described are by way of example only. Accordingly, the present invention is not limited by or to any of the described embodiments. Rather, the present invention encompasses all variations and modifications of any of the disclosed embodiments that fall within the scope of the claims.

What is claimed is:

1. A memory system comprising:
a memory device including a plurality of segments;
a processor configured to generate a Read-Modify-Write (RMW) command on a target segment address corresponding to a target segment among the plurality of segments;
a scheduler configured to receive the RMW command from the processor and schedule the RMW command; and
a RMW unit configured to execute the RMW command on the memory device according to control of the scheduler,
wherein the scheduler compares, when a plurality of RMW commands received from the processor are pending, target segment addresses of the plurality of RMW commands to re-order the plurality of RMW commands.

2. The memory system of claim 1,
wherein the scheduler controls the RMW unit to execute, after completion of execution of a first RMW command among the plurality of RMW commands, a second RMW command that is received after the first RMW command, and
wherein the second RMW command is associated with the same target segment address as the first RMW command.

3. The memory system of claim 2,
wherein the scheduler controls the RMW unit to execute, prior to the second RMW command, a third RMW command received after the second RMW command among the plurality of RMW commands, and
wherein the third RMW command is associated with a different target segment address from the first RMW command.

4. The memory system of claim 3, wherein the RMW unit performs, when executing the third RMW command directly after the first RMW command, a read operation according to the third RMW command and a write operation according to the first RMW command in parallel through a read channel and a write channel, respectively, which are separated from each other.

5. The memory system of claim 1,
is wherein the RMW command further includes information of a modification location and a modification mode,
wherein the modification location indicates a location of a value to be modified within target management information piece stored in the target segment, and wherein the modification mode indicates a modification method for modifying the value of the modification location.

6. The memory system of claim 5, wherein the RMW unit reads the target management information piece from the target segment, modifies the value of the modification location within the read target management information piece according to the modification mode, and write a modified target management information piece including the modified value into the target segment.

7. The memory system of claim 1,
further comprising a storage medium including a plurality of memory units,
wherein the plurality of segments respectively store a plurality of management information pieces and each of the plurality of management information pieces includes management information on one or more memory units, and
wherein management information on each memory unit includes information on at least one of validity of data stored in the each memory unit, a read count of the each memory unit, and an erase count of the each memory unit.

8. The memory system of claim 7,
wherein the processor generates, when an event for a target memory unit among the plurality of memory units occurs, the RMW command in order to modify, within the target segment corresponding to the target memory unit, a target management information piece on the target memory unit, and
wherein the target management information stored in the target segment includes the management information on the target memory unit.

9. The memory system of claim 1,
further comprising a second processor configured to provide, independently of the processor, the scheduler with a second RMW command for a second target segment address,
wherein the scheduler compares the target segment address and the second target segment address to schedule the RMW command and the second RMW command.

10. The memory system of claim 1,
further comprising a memory controller configured to control a storage medium according to control of the processor,
wherein the memory controller provides, independently of the processor, the scheduler with a second RMW command for a second target segment address, and
wherein the scheduler compares the target segment address and the second target segment address to schedule the RMW command and the second RMW command.

11. The memory system of claim 10,
wherein the RMW command is for modifying validity information of first data stored in the storage medium, and
wherein the second RMW command is for increasing a read count or an erase count for second data stored in the storage medium.

12. The memory system of claim 1,
further comprising a cache memory provided between the RMW unit and the memory device, and configured to operate as a cache for the memory device,
wherein the RMW unit executes the RMW command on the cache memory instead of the memory device.

13. A memory system comprising:
a storage medium including a plurality of memory units;
a memory device configured to store management information pieces corresponding to segment addresses, each of the management information pieces including management information on one or more memory units;
a processor configured to generate, when an event for a first target memory unit among the plurality of memory units occurs, a first RMW command on a first target segment address among the segment addresses, the first target segment address corresponding to a first target management information piece including management information on the first target memory unit;
a memory controller configured to access a second target memory unit among the plurality of memory units according to control of the processor and then generate a second RMW command on a second target segment address among the segment addresses, the second target segment address corresponding to a second target management information piece including management information on the second target memory unit;
a scheduler configured to receive the first RMW command and the second RMW command from the processor and the memory controller, respectively, and compare the first target segment address and the second target segment address with each other to schedule the first RMW command and the second RMW command; and
a RMW unit configured to execute the first RMW command and the second RMW command on the memory device according to a control of the scheduler.

14. The memory system of claim 13, wherein the scheduler controls the RMW unit to execute, when the first target segment address is the same as the second target segment address, the other RMW command received after one RMW command between the first RMW command and the second RMW command, after execution of the one RMW command.

15. The memory system of claim 14, wherein the scheduler controls the RMW unit to execute, when a third RMW command on a third target segment address is received after the other RMW command from the processor or the memory controller and the third target segment address is different from the first target segment address and the second target segment address, the third RMW command prior to the other RMW command.

16. The memory system of claim 15, wherein the RMW unit performs, when executing the third RMW command directly after the one RMW command, a read operation according to the third RMW command and a write operation according to the one RMW command in parallel through a read channel and a write channel, respectively, which are separated from each other.

17. The memory system of claim 13,
wherein the first RMW command is for modifying validity information of first data stored in the storage medium, and
wherein the second RMW command is for increasing a read count or an erase count for second data stored in the storage medium.

18. A memory system comprising:
a storage medium including a plurality of memory units;
a memory device configured to store management information pieces corresponding to segment addresses, each of the management information pieces including validity information on one or more memory units;

a processor configured to generate a first RMW command on a first target segment address among the segment addresses and a second RMW command on a second target segment address among the segment addresses when new data stored in a first target memory unit is stored into a second target memory unit among the plurality of memory units, the first target segment address corresponding to a first target management information piece including validity information of the data and the second target segment address corresponding to a second target management information piece including validity information of the new data; and a memory operation execution unit configured to receive the first RMW command and the second RMW command from the processor, compare the first target segment address and the second target segment address with each other to schedule the first RMW command and the second RMW command, and execute the first RMW command and the second RMW command on the memory device.

19. The memory system of claim 18, wherein the memory operation execution unit executes, when the first target segment address is the same as the second target segment address, the other RMW command received after one RMW command between the first RMW command and the second RMW command after execution of the one RMW command.

20. The memory system of claim 18, wherein the memory operation execution unit re-orders, when the first target segment address is different from the second target segment address, the first RMW command and the second RMW command to be executed out-of-order.

21. The memory system of claim 18, wherein the processor generates the first RMW command to modify the validity information of the data in order to include information that the data is invalid and generates the second RMW command to modify the validity information of the new data in order to include information that the new data is valid.

* * * * *